(12) United States Patent
Kangas et al.

(10) Patent No.: US 9,672,489 B1
(45) Date of Patent: Jun. 6, 2017

(54) INVENTORY VALIDATOR WITH NOTIFICATION MANAGER

(71) Applicant: Sprint Communications Company L.P., Overland Park, KS (US)

(72) Inventors: Lukas J. Kangas, Pembroke Pines, FL (US); Matthew Kurtz, Altamonte Springs, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 429 days.

(21) Appl. No.: 14/243,882

(22) Filed: Apr. 2, 2014

(51) Int. Cl.
    *G06Q 10/00*      (2012.01)
    *G06F 15/173*      (2006.01)
    *G06Q 10/08*      (2012.01)

(52) U.S. Cl.
    CPC .................................. *G06Q 10/087* (2013.01)

(58) Field of Classification Search
None
See application file for complete search history.

(56) References Cited

U.S. PATENT DOCUMENTS

| | | | |
|---|---|---|---|
| 6,833,787 B1* | 12/2004 | Levi ........................ | B60R 25/04 340/539.11 |
| 8,566,589 B1* | 10/2013 | Satish ................. | H04L 63/1483 713/168 |
| 8,819,209 B1* | 8/2014 | Chen .................... | H04L 61/1511 709/223 |
| 2007/0198745 A1* | 8/2007 | Fornari ............... | H04L 67/1095 709/248 |
| 2008/0222604 A1* | 9/2008 | Murphy .................... | G06F 8/61 717/120 |
| 2010/0046791 A1* | 2/2010 | Glickman .............. | G06K 9/209 382/100 |
| 2013/0276053 A1* | 10/2013 | Hugard, IV .......... | H04L 63/104 726/1 |

\* cited by examiner

*Primary Examiner* — Ariel Yu (57) ABSTRACT

A validator for an inventory management system is provided. The validator comprises at least one validation module, wherein the at least one validation module validates at least a portion of inventory information in the inventory management system by comparing the portion of inventory information to equivalent information in an information source that is one of a group of information sources comprising at least one of: a domain name system for converting a name of an alphanumerically labeled network component into an IP address, an automated monitoring system for monitoring a status of equipment for which the inventory management system maintains inventory information, a backup system capable of recording errors that occur in a data backup procedure, and a photograph system that maintains photographs of equipment for which the inventory management system maintains inventory information.

20 Claims, 3 Drawing Sheets

INVENTORY VALIDATOR WITH NOTIFICATION MANAGER

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An enterprise may implement an inventory management system to keep track of items used within the enterprise. For example, a business that deploys a large amount of computer equipment, such as servers, routers, switches, and computers, may use an inventory management system that maintains information about the equipment and any software the equipment may execute. Information that may be maintained in such an inventory management system may include, but is not limited to, an identifier for an item, such as a serial number, the physical and/or logical location of the item, the current operational status of the item, a date when the item was placed into use, a date when the item is to be removed from use, other items to which the item is connected or is otherwise related, the person or organization responsible for the item along with contact information for that person or organization, and similar information that the business might wish to maintain in order to easily discover the status of the item. In some cases, such an inventory management system may be deployed in a web-based system that allows users connected to a network to visit a web page to check on the status of an item and/or to update the status of an item.

SUMMARY

In an embodiment, a validator for an inventory management system is provided. The validator comprises at least one validation module. The at least one validation module validates at least a portion of inventory information in the inventory management system by comparing the portion of inventory information to equivalent information in an information source that is one of a group of information sources comprising at least one of: a DNS system for converting a name of an alphanumerically labeled network component into an IP address, an automated monitoring system for monitoring a status of equipment for which the inventory management system maintains inventory information, a backup system capable of recording errors that occur in a data backup procedure, and a photograph system that maintains photographs of equipment for which the inventory management system maintains inventory information.

In another embodiment, a validator for an inventory management system is provided. The validator comprises a control component, a notification component, and a plurality of validation modules. Each validation module validates a different portion of inventory information in the inventory management system and, responsive to discovering invalid information in the inventory management system, informs the control component of the discovery of the invalid information. Responsive to being informed by at least one of the validation modules about the discovery of the invalid information, the control component instructs the notification component to send a notification about the invalid information to a party responsible for the invalid information.

In another embodiment, a method for validating inventory information in an inventory management system is provided. The method comprises providing a first portion of the inventory information to a first validation module; providing a second portion of the inventory information to a second validation module; instructing the first validation module to perform a first validation procedure on the first portion of the inventory information; instructing the second validation module to perform a second validation procedure on the second portion of the inventory information; receiving from at least one of the first validation module and the second validation module a report that at least one of the first validation procedure and the second validation procedure discovered invalid information in the inventory management system; and instructing a notification component to send a notification about the invalid information to a party responsible for the invalid information, wherein contact information for the responsible party is associated with the invalid information in the inventory management system.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Embodiments of the present disclosure provide an inventory validator for an inventory management system. The inventory validator may automatically compare information in the inventory management system with equivalent information available from other sources. If an item of information in the inventory management system does not correspond to equivalent information obtained from another source, it is determined that the item of information in the inventory management system is not valid. A notification may then be automatically sent to the person or organization responsible for that information informing that party that the invalid information in the inventory management system needs to be updated. Validation procedures for information in the inventory management system may include comparing a network component's address as recorded in the inventory management system to an address for that network component returned by a domain name system, comparing information stored in the inventory management system regarding the operational status of a piece of equipment to information regarding the operational status of the piece of equipment obtained from an automated monitoring system, determining if a backup system has recorded an error in a backup procedure for data maintained in the inventory management system, and/or determining if a photograph of a piece of equipment is present in the inventory management system.

In an embodiment, the inventory validator is a modular system comprising a plurality of validation modules that can execute independently of one another. Each validation module may compare information in the inventory management system with information from a different source. A control component within the inventory validator may populate each validation module with inventory information on which the module is to perform its validation procedure, and the validation procedures may then execute concurrently in separate threads. If a validation module discovers a discrepancy between the information in the inventory management system and the information obtained from another source, the validation module may report the discrepancy to the control component.

Each validation module may report to the control component in the same format, thus promoting the modularity of the inventory validator system. That is, a user may create a validation module that performs a validation procedure on substantially any source of information using substantially any desired technique for performing the validation. As long as the standard format for reporting the pass or fail status of a validation procedure is followed, the newly created validation module may be seamlessly plugged in to the inventory validator system. The module may then execute concurrently with any previously existing validation modules and report its validation results to the control component.

Currently existing inventory management systems may rely on human intervention to keep the information in the systems up to date. That is, when a change occurs in an inventory item, a person responsible for that item may be expected to update an inventory management system with the changed information about that item. When such human-based updating is expected, the information in an inventory management system is prone to becoming stale. For example, the responsible party may be unaware that a change has occurred, may be aware of a change but may fail to update the inventory management system in a timely manner, or may otherwise fail to keep the information in the inventory management system as fresh as is desired. When such information becomes stale, a system or piece of equipment that relies on the information may not function properly.

Embodiments of the present disclosure may overcome the deficiencies that may result from reliance on human intervention to update an inventory management system. Rather than a human having the responsibility for determining when a change is needed in inventory information, the automated inventory validator disclosed herein automatically discovers when such a change may be needed. In some embodiments, the inventory validator may then send the appropriate party a notification that an update may be needed. In other embodiments, the inventory validator may automatically make the update and send the appropriate party a notification that confirmation of the updated information is needed.

Figure 1:
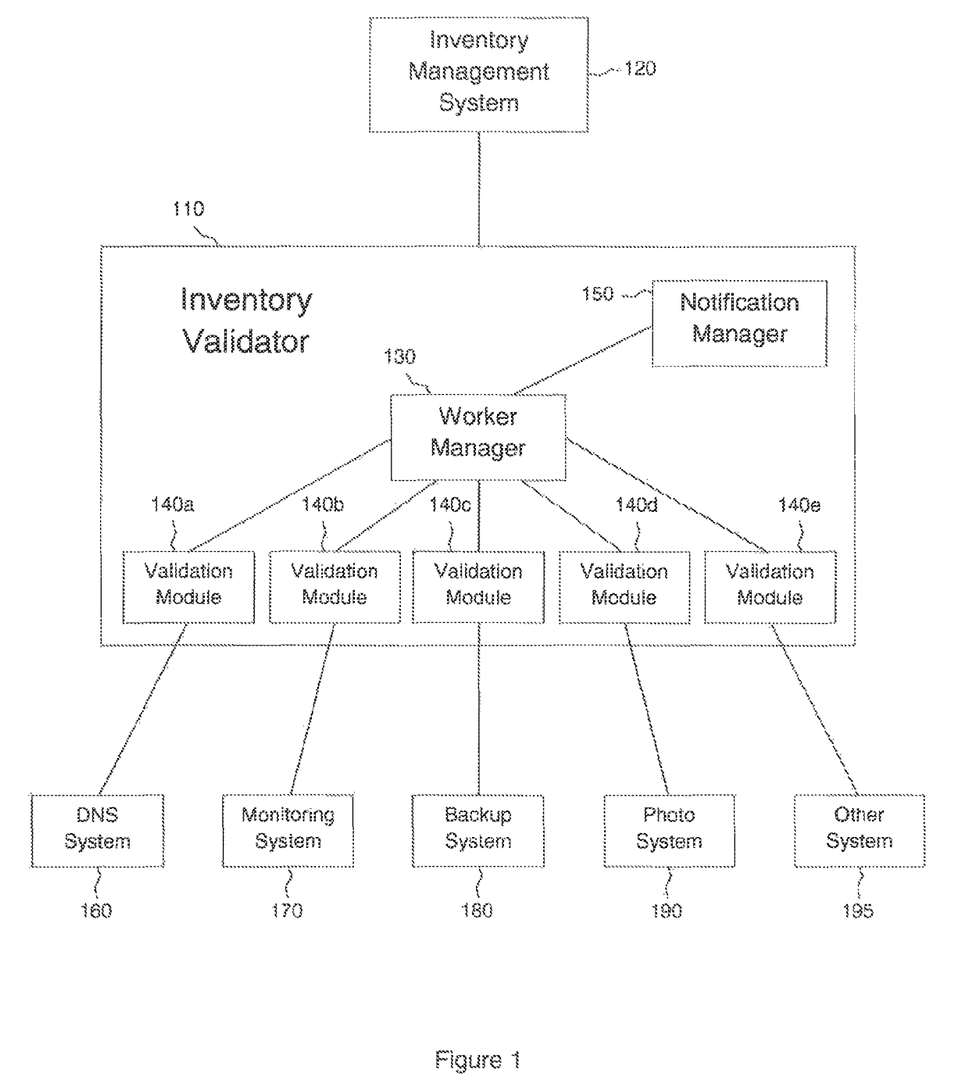
FIG. 1 is a block diagram of an inventory validator and associated systems according to an embodiment of the disclosure.

FIG. 1 illustrates an embodiment of an automated inventory validator 110 for an inventory management system 120. The inventory management system 120 may be a web-based system that allows viewing and updating of inventory information via a network. In the following discussion, it may be assumed that the inventory management system 120 maintains information about computer hardware and software, but it should be understood that the embodiments disclosed below are examples only and that the discussion may be applicable to other types of inventory items. While the inventory validator 110 is depicted outside the inventory management system 120, the inventory validator 110 may be a component within the inventory management system 120.

In an embodiment, the inventory validator 110 includes a worker manager 130, thread manager, control module, management module, master program, or some other type of control component that manages a plurality of validation modules 140. Hereinafter, such a control component may be referred to as the worker manager 130. Each of the validation modules 140 executes independently and validates a different portion of the information in the inventory management system 120. Each validation module 140 may use a different procedure for validating information in the inventory management system 120. In some cases, a validation module 140 may validate inventory information by comparing information stored in the inventory management system 120 to equivalent information obtained from a source that is presumed to have valid information.

During or after execution, each validation module 140 reports the results of its validation procedure to the worker manager 130. That is, each validation module 140 may inform the worker manager 130 of any information in the inventory management system 120 that is invalid and may need to be updated. The results report may take the form of a pass or fail indication for each inventory item for which a validation procedure was performed. Alternatively, each validation module 140 may report only the inventory items found to be invalid.

As described in more detail below, the inventory validator 110 may also include a notification manager 150 that can receive from the worker manager 130 information about updates that are needed to the inventory management system 120. Based on that information, the notification manager 150 may automatically send notifications about the needed updates to the individuals or organizations responsible for making the updates.

Examples of systems from which the validation modules 140 may obtain information that may be compared to information in the inventory management system 120 include a domain name system (DNS) system 160, a monitoring system 170, a backup system 180, a photograph system 190, and one or more additional systems 195. More specifically, a first validation module 140a may obtain information from the DNS system 160, a second validation module 140b may obtain information from the monitoring system 170, a third validation module 140c may obtain information from the backup system 180, a fourth validation module 140d may obtain information from the photograph system 190, and a fifth or more validation module 140e may obtain information from the one or more other systems 195.

The DNS system 160 is a system for converting the name of an alphanumerically labeled network component into an internet protocol (IP) address. The network component might be assigned a name that is easy for humans to remember, but the network component's actual address that is used by other network components might be a string of digits that is more difficult for humans to remember. The DNS system 160 can translate between the two naming conventions. For example, the DNS system 160 might convert the host name www.example.com to an IP address such as 123.456.789.0.

In an embodiment, at least one of the items of information maintained by the inventory management system 120 is the IP address associated with the name of a particular network component. For example, a business might deploy a plurality of servers and give the servers easily recognizable English names. The inventory management system 120 might maintain a database or other data record that associates the English names with their corresponding IP addresses.

In an embodiment, the worker manager 130 provides the DNS system validation module 140*a* with one or more host names or other network component names in the inventory management system 120 and with the IP address associated with each of the one or more host names. The DNS system validation module 140*a* performs an actual DNS lookup in the DNS system 160 on the same host names and determines the IP addresses that are returned by the DNS system 160. If the IP address returned by the DNS system 160 for a particular host name matches the IP address in the inventory management system 120 for the same host name, the DNS system validation module 140*a* determines that the IP address in the inventory management system 120 is valid. If the IP address returned by the DNS system 160 does not match the IP address in the inventory management system 120, the DNS system validation module 140*a* determines that the IP address in the inventory management system 120 is invalid. As described in more detail below, the DNS system validation module 140*a* may inform the worker manager 130 of any invalid DNS-related information, and the worker manager 130 may inform the notification manager 150 that a notification about the invalid DNS-related information should be sent. The DNS system validation module 140*a* may perform a similar validation procedure for all or a portion of the host names in the inventory management system 120. In other embodiments, the DNS system validation module 140*a* may validate DNS-related information in other manners.

In an embodiment, the monitoring system 170 may be an automated system that monitors the status of a computer network for which the inventory management system 120 maintains inventory information. For example, the monitoring system 170 may perform service checks to determine such information as which components in the network are currently in operation and which components are not in operation, whether any errors have occurred in the components, the load on a processor, the usage of a disk, and other checks to determine the status of network components.

In an embodiment, the monitoring system validation module 140*b* compares information stored in the inventory management system 120 to equivalent information obtained from the monitoring system 170. The information that is compared may be any data stored in the inventory management system 120 for which equivalent information can be obtained from the monitoring system 170. If the monitoring system validation module 140*b* discovers a discrepancy between information stored in the inventory management system 120 and equivalent information obtained from the monitoring system 170, the monitoring system validation module 140*b* may inform the worker manager 130 of the discrepancy. The worker manager 130 may then instruct the notification manager 150 to send an appropriate notification about the discrepancy.

As an example, the inventory management system 120 may maintain data regarding whether a particular network component is operating in a production environment or a development environment. The enterprise implementing the inventory management system 120 may specify that only production servers, and not development servers, should be monitored by the monitoring system 170. If the monitoring system validation module 140*b* determines that a particular server is visible to the monitoring system 170, then the monitoring system validation module 140*b* may conclude that that server must be in production. If the inventory management system 120 indicates that that server is designated for development, then the monitoring system validation module 140*b* may determine that a discrepancy exists between the inventory management system 120 and the monitoring system 170 and may inform the worker manager 130 of the discrepancy.

As another example, it may be known that production servers should not be out of operation for any extended length of time. If the monitoring system 170 indicates that a server has not been in operation for an extended period of time, such as several days, the monitoring system validation module 140*b* may conclude that the server is not in production. If the inventory management system 120 indicates that that server is designated for production, the monitoring system validation module 140*b* may determine that a discrepancy exists between the inventory management system 120 and the monitoring system 170 and may report an instance of invalid data in the inventory management system 120 to the worker manager 130. In other embodiments, the monitoring system validation module 140*b* may validate monitoring-related information in other manners.

The backup system 180 may be a system for duplicating data and storing the duplicate for potential later use as a backup for the original data. The backup system 180 may maintain records of any errors that may have occurred during a backup procedure. In an embodiment, the backup system validation module 140*c* examines the records of the backup system 180 to determine if any errors have occurred in a backup procedure. If the backup system validation module 140*c* finds a record of an error in the backup system 180, the backup system validation module 140*c* may report the error to the worker manager 130.

Alternatively, the backup system 180 may report backup-related errors to the inventory management system 120. In this case, the backup system validation module 140*c* may examine the records of the inventory management system 120 for backup-related errors and may report any errors discovered to the worker manager 130.

In either alternative, after receiving a report of a backup error, the worker manager 130 may instruct the notification manager 150 to send a notification to an appropriate party that a backup error has occurred. In other embodiments, the backup system validation module 140*c* may validate backup-related information in other manners.

The photograph system 190 may be a system that allows a person associated with the inventory management system 120 to observe photographs of components cataloged in the inventory management system 120. While shown outside the inventory management system 120, the photograph system 190 may be a component within the inventory management system 120. In an embodiment, an enterprise may request that photographs be taken of at least a portion of the equipment in the enterprise and that the photographs be made available to one or more persons associated with the inventory management system 120. For example, it may be requested that the photographs be published to a web site accessible by one or more persons associated with the inventory management system 120. Such a web site or other medium for observing the equipment photographs may be considered a component within the inventory management system 120 and/or may be considered a component within the photograph system 190.

Having the equipment photographs available to the inventory management system 120 may facilitate the management tasks of persons associated with the inventory management system 120 by allowing such persons to examine a photograph to obtain information about a piece of equipment rather than physically visiting the location of the equipment. For example, such persons may view a photograph to determine a serial number or other identifier for a piece of equipment, to determine the quantity and connection points of any cables that are connected to the equipment, to determine whether the equipment is in the appropriate physical location, and to determine any other information that may be obtained from a visual inspection of the equipment. Photographs may be taken from a plurality of angles to allow different types of information about a piece of equipment to be captured.

In an embodiment, if a photograph of a piece of equipment has not been made available as requested, a stock image may be displayed when an attempt is made to view a photograph of the piece of equipment. The stock image may display a message indicating that no photograph is available for that piece of equipment, may be a generic image with no verbal content, or may have some other content. Regardless of the content of the image, in an embodiment, the same stock image is displayed whenever a request is made to view a photograph of a piece of equipment for which no photograph is available in the inventory management system 120 or the photograph system 190.

In an embodiment, the photograph system validation module 140*d* determines whether a photograph of a particular piece of equipment is available. The photograph system validation module 140*d* may make such a determination by requesting a photograph of the piece of equipment and then performing a hash operation or a similar operation on the content of the image that is returned in reply to the request. As used herein, the term "hash operation" may refer to any operation that generates a set of characters based on an input of data. For example, a hash operation may be a well-known hash function, such as the MD5 hash algorithm or the SHA-1 hash algorithm, that generates a string of symbols with a length that may be controlled by an input to the function. Alternatively, a hash operation may be an error checking function such as a cyclic redundancy check. As another alternative, a hash operation may simply determine a sum or perform some other mathematical operation on the values in a set of input data. In any case, the hash operation returns the same result for the same input data and is highly unlikely to return the same result for different input data.

Since the same stock image is displayed for any piece of equipment for which no photograph is available, the hash operation will produce the same value whenever a photograph is not available for a piece of equipment. The photograph system validation module 140*d* may be aware of this value and may compare the known value to the value produced when the hash operation is performed on a photograph returned in reply to a request. When the value produced by the hash operation on a requested photograph is equal to the value known to be produced when a photograph is not available, the photograph system validation module 140*d* may determine that no photograph is available for the piece of equipment for which a photograph was requested. The photograph system validation module 140*d* may then report this error condition to the worker manager 130. When the value produced by the hash operation on a requested photograph is any value other than that known to be produced when a photograph is not available, the photograph system validation module 140*d* may assume that a legitimate photograph is available for the piece of equipment for which a photograph was requested. In other embodiments, the photograph system validation module 140*d* may validate photograph-related information in other manners.

The inventory validator 110 may be able to validate additional information in the inventory management system 120 by comparing the inventory information to information from one or more other information sources or other systems 195. Due to the modularity of the validation modules 140, one or more additional validation modules 140*e* can easily be created and added to the inventory validator 110 to validate inventory information against the information from the other systems 195.

In an embodiment, as mentioned above, the inventory validator 110 is a modular system that allows validation modules 140 to be easily added or removed. This modularity may be achieved by specifying that any information provided by the validation modules 140 to the worker manager 130 is to have a standardized format and any information provided by the worker manager 130 to the validation modules 140 is to have a standardized format. For example, all reports of invalid data sent by any of the validation modules 140 to the worker manager 130 may have the same format. Also, as described in more detail below, the worker manager 130 may use a standard format for providing data to any of the validation modules 140. The standardization of inputs to and outputs from the validation modules 140 allows the internal validation procedures used by the validation modules 140 to take any desired form, thus allowing validation procedures to be performed on a wide variety of types of inventory-related information. Anyone wishing to validate information in the inventory management system 120 merely needs to follow the conventions for inputs to and outputs from a validation module 140 and can then create a validation module 140 appropriate for the type of information to be validated. The newly created validation module 140 can then be seamlessly added to the inventory validator 110.

In an embodiment, the validation modules 140 execute in independent threads. That is, a validation module 140 can perform its validation procedures and report invalid inventory information to the worker manager 130 without any interaction with any other validation module 140. The worker manager 130 may have the capability to receive error reports substantially simultaneously from a plurality of concurrently executing validation modules 140.

Each validation module 140 may initiate its validation procedures responsive to receiving instructions from the worker manager 130 to commence execution. Each validation module 140 may then retrieve from the inventory management system 120 the data to be validated by that validation module 140. For example, the DNS system validation module 140*a* may retrieve DNS-related information from the inventory management system 120 for validation, the monitoring system validation module 140*b* may retrieve monitoring-related information from the inventory management system 120 for validation, and so on. Any information retrieved by a validation module 140 for validation may have a standardized format to promote the modularity of the validation modules 140. The worker manager 130 may then spawn a plurality of threads in which the validation procedures will execute. If a validation procedure discovers invalid data, the validation procedure adds the invalid data to a queue with appropriate reporting information. When all validation procedures are complete, notifications may be sent out for all the invalid data in the queue.

In an embodiment, the worker manager 130 may instruct the validation modules 140 to execute on a periodic basis and, in some cases, such instructions may be provided to all of the validation modules 140 substantially simultaneously. For example, the worker manager 130 may instruct all the validation modules 140 to commence execution once every hour, once every day, once every week, or at some other time interval. Since each validation module 140 may execute for a different length of time, the validation modules 140 may not cease execution at the same time even though they may begin execution at the same time. The worker manager 130 may not instruct the validation modules 140 to begin another round of execution until all of the validation modules 140 have completed their previous rounds of execution, thus keeping each round of execution distinct from the others. Alternatively, the worker manager 130 may initiate execution of different validation modules 140 at different time intervals, such as once per hour for some validation modules 140, once per day for other validation modules 140, and so on.

As mentioned above, the inventory validator 110 may include a notification manager 150 that can automatically provide an appropriate notification regarding invalid data discovered in the inventory management system 120 by a validation module 140. In an embodiment, the notification may be an email, and the discussion hereinafter may assume that the notification is an email, but the notification could take other forms. In an embodiment, the notification is sent to a person or organization responsible for ensuring the validity of the pertinent data. For example, if an invalid association between a server name and the server's IP address is discovered in the inventory management system 120, a notification about the invalid data may be sent to the person or organization responsible for that server.

In an embodiment, an item in the inventory management system 120 may be associated with the email address of the party responsible for that item. For example, if information about a server is maintained in the inventory management system 120, the information may include, in addition to the server's name, IP address, and similar data, the email address of the person or organization to be notified when a problem with that server is discovered. When a validation module 140 reports an instance of invalid data to the worker manager 130, the worker manager 130 may retrieve from the inventory management system 120 the email address associated with the invalid data and provide that email address to the notification manager 150. Alternatively, the worker manager 130 may inform the notification manager 150 of the invalid data, and the notification manager 150 may retrieve the email address associated with the invalid data from the inventory management system 120. In either case, the notification manager 150 may then take any actions necessary to automatically send an appropriate notification email about the invalid data to the appropriate party.

In an embodiment, the worker manager 130 may consolidate all of the reports of invalid data received from all of the validation modules 140 into a single notification list and provide the notification list to the notification manager 150. The notification list may document all instances of invalid data discovered in the most recent execution of the validation modules 140 and may include contact information for the parties responsible for the invalid data.

The worker manager 130 may organize the notification list according to the contact information. For example, the worker manager 130 may determine from the reports received from the validation modules 140 that a single party is responsible for a plurality of instances of invalid data. In such cases, the worker manager 130 may instruct the notification manager 150 to send that party a single notification listing all instances of invalid data for which that party is responsible.

Alternatively, the notification manager 150 may perform such an organization of a notification list. That is, the worker manager 130 may send the notification manager 150 a list of all instances of invalid data discovered by the validation modules 140 but may not send the associated contact information. The notification manager 150 may then obtain from the inventory management system 120 the contact information associated with the invalid data, organize one or more notifications based on the contact information, and send appropriate notifications to the appropriate parties.

In the above embodiments, a party receiving a notification of invalid data in the inventory management system 120 may be expected to take any steps necessary to correct the invalid data. If the party does not correct the invalid data, the party may receive another notification after the next round of execution of the validation modules 140, and the notifications may continue until the invalid data is corrected.

In an alternative embodiment, the inventory validator 110 may automatically take at least a portion of the steps needed to correct the invalid data. For example, if the DNS system validation module 140a discovers that the IP address associated with a host name in the inventory management system 120 is not the same as the IP address returned when a DNS lookup is actually performed on that host name, the DNS system validation module 140a may assume that the IP address returned by the DNS system 160 is the correct IP address. The inventory validator 110 may then automatically update the inventory management system 120 with the IP address that was actually returned. Similar automatic updates to the inventory management system 120 may be made based on information provided by the other validation modules 140. When such an automatic update is made, the inventory validator 110 may send a notification to the party responsible for the invalid data informing the party of the update and instructing the party to confirm that the update is correct.

Figure 2:
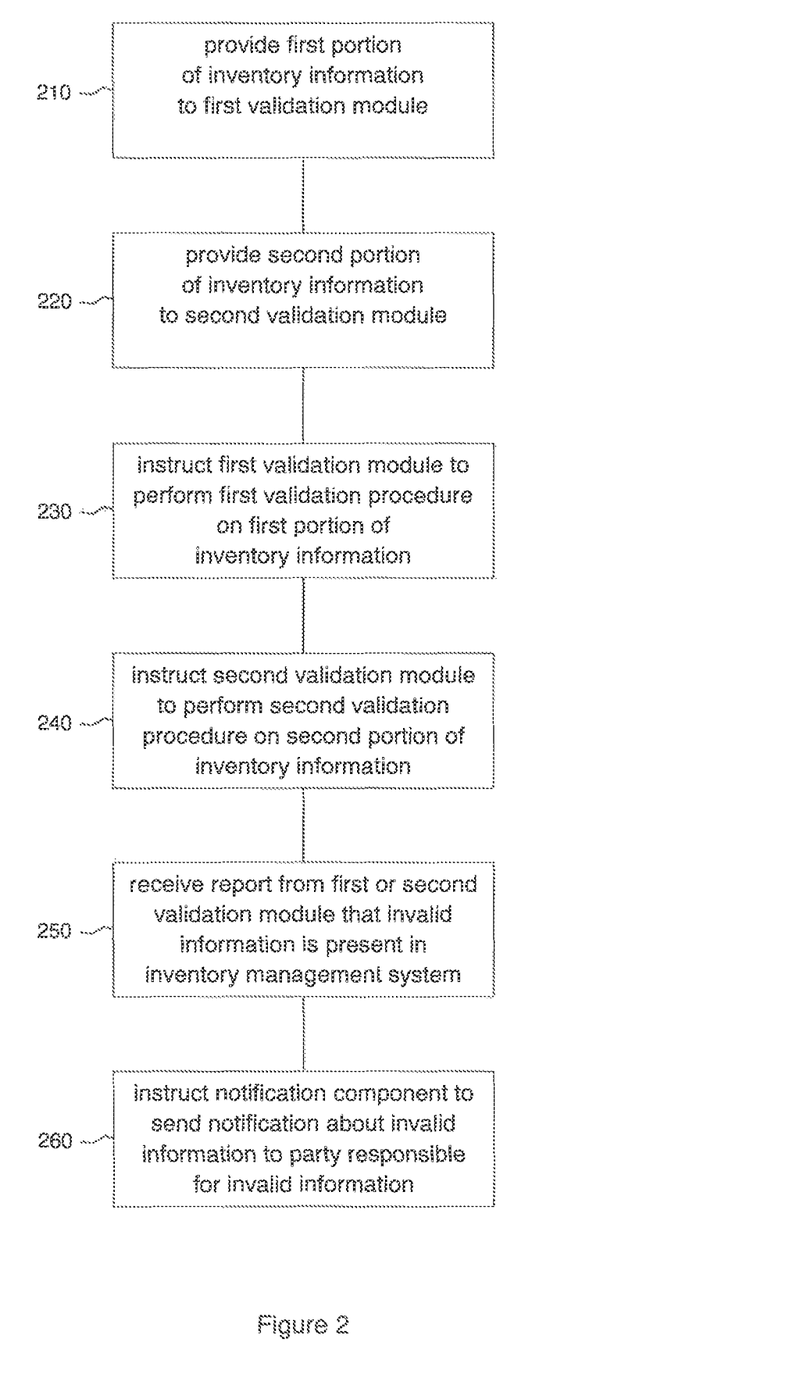
FIG. 2 is a flow chart illustrating a method for validating inventory information in an inventory management system according to an embodiment of the disclosure.

FIG. 2 is a flow chart illustrating an embodiment of a method for validating inventory information in an inventory management system. At block 210, a first portion of the inventory information is provided to a first validation module. At block 220, a second portion of the inventory information is provided to a second validation module. At block 230, the first validation module is instructed to perform a first validation procedure on the first portion of the inventory information. At block 240, the second validation module is instructed to perform a second validation procedure on the second portion of the inventory information. At block 250, a report that at least one of the first validation procedure and the second validation procedure discovered invalid information in the inventory management system is received from at least one of the first validation module and the second validation module. At block 260, a notification component is instructed to send a notification about the invalid information to a party responsible for the invalid information. The contact information for the responsible party may be associated with the invalid information in the inventory management system.

It should be understood that the steps depicted in FIG. 2 do not necessarily take place in the order shown. For example, the provisions of the first and second portions of the inventory information to the first and second validation modules are shown as separate steps, but these steps may occur substantially simultaneously with one another. Similarly, the instructions to perform the first and second validation procedures may be given substantially simultaneously with one another.

Figure 3:
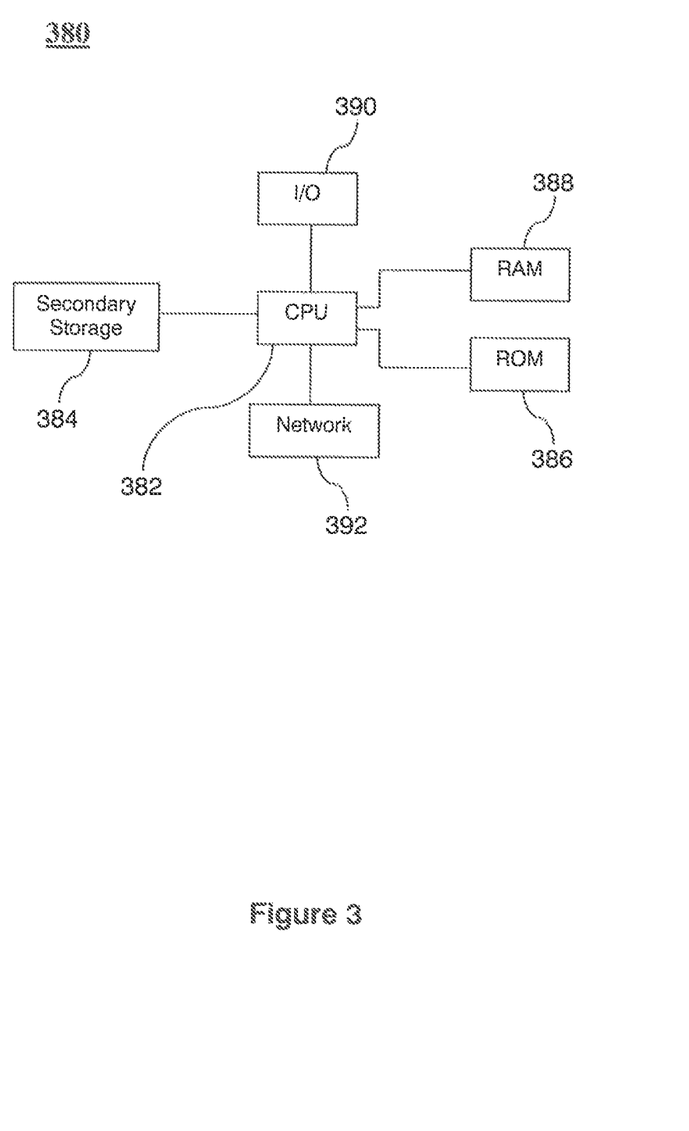
FIG. 3 illustrates an exemplary general purpose computer system suitable for implementing the several embodiments of the disclosure.

Some aspects of the system described above may be implemented on any general-purpose computer with sufficient processing power, memory resources, and network throughput capability to handle the necessary workload placed upon it. FIG. 3 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 392 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An inventory management system for dynamically maintaining servers on a network, the system comprising:
   a plurality of servers communicatively coupled to the network;
   a domain name system (DNS) computer system coupled to the network and configured to convert a name of an alphanumerically labeled network component into an internet protocol (IP) address;
   an automated monitoring system computer coupled to the network and configured to monitor a status of equipment for which the inventory management system maintains inventory information;
   a backup system computer coupled to the network and configured to record errors that occur in a data backup procedure;

a photograph system computer coupled to the network and configured to maintain photographs of equipment for which the inventory management system maintains inventory information; and a validator computer system communicatively coupled to the network, the validator computer system comprising:

a processor, and a non-transitory memory storing a thread manager and at least one validation module for communicating with each of the DNS computer system, the automated monitoring system computer, the backup system computer, and the photograph system computer, wherein upon execution of the thread manager and the at least one validation module, the processor:

spawns a first thread on the processor for a DNS validation module and a second thread on the processor for a monitoring system validation module, provides a first portion of inventory information to the DNS validation module via the first thread and a second portion of inventory information to the monitoring system validation module via the second thread, validates the first portion of inventory information in the inventory management system by comparing the first portion of inventory information to equivalent information from the DNS computer system, discovers, from the DNS validation module based on the first portion of inventory information, that an IP address returned by the DNS computer system is not the same as an IP address associated with a host name in the inventory management system, responsive to the discovery, updates the inventory management system with the IP address returned by the DNS computer system, responsive to the second portion of inventory information being provided to the monitoring system validation module via the second thread, determines, via the monitoring system validation module, that a particular server of the plurality of servers has not been in operation for a period of time, determine that a discrepancy exists between the inventory management system and the automated monitoring system computer based on the particular server not being in operation for the period of time but being designated as a production server, identify the second portion of inventory information as an instance of invalid data based on the discrepancy, and report the instance of invalid data from the monitoring system validation module to the thread manager.

2. The system of claim 1, wherein, responsive to discovering invalid information in the inventory management system, the validator computer system sends a notification about the invalid information to a party responsible for the invalid information.

3. An inventory management system for dynamically maintaining servers on a network, the system comprising:

a server communicatively coupled to the network; and a validator computer system communicatively coupled to the server, a domain name system (DNS) computer system, an automated monitoring computer system, a backup computer system, and a photograph computer system, the validator computer system comprising:

a processor; and a non-transitory memory storing a control component, a notification component, and a plurality of validation modules that includes at least a DNS validation module and a monitoring system validation module, wherein upon execution of the control component, the processor:

spawns a first thread on the processor for the DNS validation module and a second thread on the processor for the monitoring system validation module, provides a first portion of inventory information to the DNS validation module and a second portion of inventory information to the monitoring system validation module, where each module validates, via independent execution of the first and second threads, the portions of inventory information in the inventory management system, discovers, from the DNS validation module based on the first portion of inventory information, that an IP address returned by the DNS computer system is not the same as an IP address associated with a network component name in the inventory management system, responsive to the discovery, updates the inventory management system with the IP address returned by the DNS computer system, and responsive to being informed by the DNS validation module about the discovery, instructs, via the control component, the notification component to send a notification about the discovery to an email address associated with a party responsible for the network component name in the inventory management system.

4. The system of claim 3, wherein each validation module validates the portion of inventory information in the inventory management system by comparing the portion of inventory information to associated information in one information source from a plurality of information sources, the plurality of information sources comprising at least two of:

the DNS computer system for converting a name of an alphanumerically labeled network component into an internet protocol (IP) address;

the automated monitoring computer system for monitoring a status of equipment for which the inventory management system maintains inventory information;

the backup computer system capable of recording errors that occur in a data backup procedure; and the photograph computer system that maintains photographs of equipment for which the inventory management system maintains inventory information.

5. The system of claim 4, wherein upon execution of one of the validation modules, the processor validates information in the inventory management system by performance of a DNS lookup on a network component name stored in the inventory management system, comparison of comparing an IP address returned by the DNS computer system for the network component name to an IP address associated with the network component name in the inventory management system, and in response to determination that the returned IP address is not the same as the associated IP address, informs the control component that the associated IP address is invalid.

6. The system of claim 4, wherein one of the validation modules validates information in the inventory management system by comparing information stored in the inventory management system regarding an operational status of a piece of equipment to information regarding an operational status of the piece of equipment obtained from the automated monitoring computer system, and when the stored operational status information is not the same as the obtained operational status information, informing the control component that the stored operational status information is invalid.

7. The system of claim 4, wherein one of the validation modules validates information in the inventory management system by determining if the backup computer system has recorded an error in a backup procedure for data maintained in the inventory management system, and when the backup computer system has recorded an error, informing the control component that the error was recorded.

8. The system of claim 4,
wherein one of the validation modules validates information in the inventory management system by determining if a photograph of a piece of equipment is present in the inventory management system, and
wherein the validation module makes the determination by:
requesting a photograph of the piece of equipment,
performing a hash operation on the content of an image returned in reply to the request,
comparing an output of the hash operation on the content to an output of the hash operation known to be produced when a photograph of the piece of equipment is not present in the inventory management system, and
when the output of the hash operation on the content matches the output of the hash operation known to be produced when a photograph of the piece of equipment is not present in the inventory management system, informing the control component that a photograph of the piece of equipment is not present in the inventory management system.

9. The system of claim 4,
wherein, when a validation module discovers invalid information in the inventory management system, the validation module provides to the control component the equivalent information to which the invalid information was compared, and
wherein the control component automatically updates the inventory management system with the equivalent information and instructs the notification component to send a notification to the party responsible for the invalid information informing the party to confirm that the automatic update was correct.

10. The system of claim 3, wherein the control component provides each of the validation modules with a respective portion of inventory information that the respective validation module is to validate and instructs each of the validation modules to commence execution of a respective validation procedure on a respective portion of inventory information, and wherein each validation procedure executes in a separate thread concurrently with the other validation procedures.

11. The system of claim 9, wherein the control component provides each of the validation modules with the respective portion of inventory information in a common output format, and wherein the control component is informed about invalid information by the validation modules in a common input format.

12. The system of claim 3, wherein, when the control component is informed of the discovery of invalid information, the control component obtains from the inventory management system contact information associated with the invalid information and provides the contact information to the notification component as the responsible party to which the notification component is to send the notification about the invalid information.

13. A method for dynamically maintaining servers on a network in an inventory management system, the method comprising:
spawning, by executing a thread manager on a processor of a validator computer system, a first thread on a processor for a domain name system (DNS) validation module and a second thread on the processor for a monitoring system validation module;
providing, by executing the thread manager on the validator computer system, a first portion of inventory information to the DNS validation module, wherein the inventory information is associated with a server communicatively coupled to the validator computer system;
providing, by the validator computer system, a second portion of the inventory information to the monitoring system validation module;
instructing, by the validator computer system, the DNS validation module to perform a first validation procedure on the first portion of the inventory information via the first thread;
instructing, by the validator computer system, the monitoring system validation module to perform a second validation procedure on the second portion of the inventory information via the second thread;
in response to the instruction to perform the first validation procedure:
performing, by executing the DNS validation module, a DNS lookup on a network component name stored in a non-transitory memory of the inventory management system;
comparing, by executing the DNS validation module, an IP address returned by the DNS system for the network component name to an IP address associated with the network component name in the inventory management system; and
responsive to the returned IP address not being the same as the associated IP address, sending, from the DNS validation module to the thread manager, a report indicating that the IP address associated with the network component name is invalid;
responsive to the instruction to perform the second validation procedure and the second portion of inventory information being provided to the monitoring system validation module via the second thread:
determining, via the monitoring system validation module, that a particular server on the network has not been in operation for a period of time and that a discrepancy exists between the inventory management system and an automated monitoring system based on the particular server not being in operation for the period of time but being designated as a production server;
identifying, via the monitoring system validation module, the second portion of inventory information as an instance of invalid information based on the discrepancy; and
generating, via the monitoring system validation module, a report of the instance of invalid information for the thread manager;
receiving from the DNS validation module and the monitoring system validation module reports that the first validation procedure and the second validation procedure discovered invalid information in the inventory management system; and instructing, by the thread manager of the validator computer system, a notification component to send a notification about the invalid information to an email address associated with a party responsible for the invalid information.

14. The method of claim 13, wherein each of the DNS validation module and the monitoring system validation module validates a respective portion of inventory information by comparing the respective portion of inventory information to equivalent information in one of a plurality of information sources, the plurality of information sources comprising at least two of:

a DNS system for converting a name of an alphanumerically labeled network component into an internet protocol (IP) address;

the automated monitoring system for monitoring a status of equipment for which the inventory management system maintains inventory information;

a backup system capable of recording errors that occur in a data backup procedure; and a photograph system that maintains photographs of equipment for which the inventory management system maintains inventory information.

15. The method of claim 14, wherein one of the first and second validation procedures comprises:

when the returned IP address is not the same as the associated IP address, generating, from the thread manager to the notification component executing on the validator computer system, a report indicating that the associated IP address is invalid.

16. The method of claim 14, wherein one of the first and second validation procedures comprises:

comparing information stored in the inventory management system regarding an operational status of a piece of equipment to information regarding an operational status of the piece of equipment obtained from the automated monitoring system; and when the stored operational status information is not the same as the obtained operational status information, sending a report indicating that the stored operational status information is invalid.

17. The method of claim 14, wherein one of the first and second validation procedures comprises:

determining if the backup system has recorded an error in a backup procedure for data maintained in the inventory management system; and when the backup system has recorded an error, sending a report indicating that the error was recorded.

18. The method of claim 14, wherein one of the first and second validation procedures comprises:

determining if a photograph of a piece of equipment is present in the inventory management system, wherein the determination is made by:

requesting a photograph of the piece of equipment, performing a hash operation on the content of an image returned in reply to the request, comparing an output of the hash operation on the content to an output of the hash operation known to be produced when a photograph of the piece of equipment is not present in the inventory management system, and when the output of the hash operation on the content matches the output of the hash operation known to be produced when a photograph of the piece of equipment is not present in the inventory management system, sending a report indicating that a photograph of the piece of equipment is not present in the inventory management system.

19. The method of claim 13, wherein the first and second validation procedures execute concurrently in separate threads.

20. The method of claim 13, wherein the first and second portions of inventory information are provided in a common output format, and wherein the reports of invalid information are received in a common input format.

* * * * *